United States Patent
Seo et al.

(10) Patent No.: US 7,167,210 B2
(45) Date of Patent: Jan. 23, 2007

(54) SIGNAL TRANSMISSION METHOD AND APPARATUS

(75) Inventors: Sang Il Seo, Seoul (KR); Hwa Young Yun, Seoul (KR); Nam Seok Jo, Kunpo (KR)

(73) Assignee: LG Electronics Inc., Seoul (KR)

( * ) Notice: Subject to any disclaimer, the term of this patent is extended or adjusted under 35 U.S.C. 154(b) by 510 days.

(21) Appl. No.: 09/903,656

(22) Filed: Jul. 13, 2001

(65) Prior Publication Data

US 2002/0057371 A1 May 16, 2002

(30) Foreign Application Priority Data

Jul. 14, 2000 (KR) .............................. 2000-40566

(51) Int. Cl.
*H04N 7/00* (2006.01)
(52) U.S. Cl. .................................................. 348/569
(58) Field of Classification Search ................ 348/569, 348/563–568, 553, 554, 461, 465, 473, 725, 348/384.1, 386.1, 388.1; 725/11, 109, 114, 725/125, 131
See application file for complete search history.

(56) References Cited

U.S. PATENT DOCUMENTS

| | | | | |
|---|---|---|---|---|
| 5,488,412 A * | 1/1996 | Majeti et al. | ............... | 725/111 |
| 5,541,657 A * | 7/1996 | Yamamoto et al. | ......... | 348/388 |
| 5,550,826 A * | 8/1996 | Tanaka et al. | ............... | 370/450 |
| 5,608,446 A * | 3/1997 | Carr et al. | .................. | 725/114 |
| 5,638,112 A * | 6/1997 | Bestler et al. | ............... | 725/151 |
| 5,739,869 A * | 4/1998 | Markle et al. | .............. | 348/589 |
| 5,920,355 A * | 7/1999 | Kim | ........................... | 348/569 |
| 5,991,832 A * | 11/1999 | Sato et al. | .................... | 710/33 |
| 6,137,539 A * | 10/2000 | Lownes et al. | ............. | 348/569 |
| 6,177,961 B1 * | 1/2001 | Blatter | ....................... | 348/563 |
| 6,442,328 B1 * | 8/2002 | Elliott et al. | .................. | 386/46 |
| 6,487,305 B2 * | 11/2002 | Kambe et al. | ............. | 382/113 |
| 6,490,002 B1 * | 12/2002 | Shintani | ..................... | 348/569 |
| 6,493,748 B1 * | 12/2002 | Nakayama et al. | ......... | 709/218 |
| 6,593,937 B2 * | 7/2003 | Ludtke et al. | ............. | 345/629 |
| 2003/0149977 A1 * | 8/2003 | Kataria | ........................ | 725/37 |

* cited by examiner

*Primary Examiner*—Paulos M. Natnael
(74) *Attorney, Agent, or Firm*—Birch, Stewart, Kolasch and Birch, LLP

(57) ABSTRACT

A signal transmission method and apparatus provides a digital transmission path and an analog transmission path between a signal output apparatus and a signal input apparatus. An audio/video signal is transmitted from the signal output apparatus to the signal input apparatus over the digital transmission path. When a user requests an on screen display (OSD) from the signal output apparatus, a controlling unit of the signal output apparatus judges a volume of the data to be displayed via the OSD. If the volume exceeds a preset limit, the OSD is transmitted to the signal input apparatus over the analog transmission path. If the volume does not exceed the preset limit, the OSD is transmitted to the signal input apparatus over the digital transmission path. The controlling unit of the signal output apparatus informs a controlling unit of the signal input apparatus of the intended path of the OSD, so that the signal input apparatus can process the OSD in the appropriate manner.

23 Claims, 3 Drawing Sheets

REMOTE CONTROLLER

SIGNAL TRANSMISSION METHOD AND APPARATUS

BACKGROUND OF THE INVENTION

1. Field of the Invention

The present invention relates to a video display apparatus, and particularly, to a signal transmission method and apparatus between appliances which are digitally connected.

2. Description of the Background Art

These days, A/V (Audio/Video) appliances operate digitally, and the digital A/V appliances are connected to each other by a digital network.

For example, a setup box and a digital TV are connected by an IEEE 1394 digital method, digital A/V contents (programs) are transmitted using an Isochronous Channel defined in IEEE 1394, and command language for control is transmitted in a AV/C (Audio/Video Control) format using Asynchronous Transaction.

In addition, an on-screen display (hereinafter, referred to as OSD) bitmap is transmitted through the Asynchronous Transaction using a method defined in an Asynchronous Connection protocol.

However, the bitmap image, such as an OSD transmitted between the A/V appliances, is used to notify a status or operation condition of the appliance, and transmission speed is an important element. However, if the image is transmitted through the digital connection, the transmission speed is lowered.

That is, the Asynchronous Connection used in the IEEE 1394 standard is a protocol originally used for transferring which should not include transfer error such as file transfer, and therefore, if the bitmap image such as OSD is transferred through the digital connection, the status and operation condition of the appliances can not be displayed in real-time.

Also, if the bitmap image, such as the OSD, is transmitted through the digital connection in the digital A/V appliances connected by the digital network, the resolution is lowered, and the status and operation conditions of the appliances are not easily recognized.

SUMMARY OF THE INVENTION

Therefore, it is an object of the present invention to provide a signal transmission apparatus and method by which the appliances transmitting digital A/V (Audio/Video) contents are also able to provide results of a user input, such as a setting change in real-time through an analog connection, and are able to provide these results with better recognition.

To achieve the objects of the present invention, the digital AV contents are transmitted through a digital connection, and the OSD (On-Screen Display) for setting operation conditions of the apparatus and controlling the apparatus is transmitted through an analog connection, between a signal output apparatus and a signal input apparatus.

That is, according to the present invention, an analog connection is set, as well as digital connection, between the signal output apparatus transmitting the digital AV contents and the signal input apparatus receiving the corresponding digital contents.

When the OSD is wanted to be transmitted during the transmission of the digital AV contents, a command is transmitted so that an input terminal of the signal input apparatus, receiving the digital AV contents, is changed from a digital terminal to an analog terminal. After that, when the need to transmit the OSD is not required, a command ordering that the input terminal is changed from the analog terminal to the digital terminal is transmitted.

Even when the OSD is transmitted through the analog connection, the digital AV contents are continually transmitted through the digital connection.

In addition, the transmission of the OSD through the analog connection occurs when the OSD is larger than a certain volume.

Therefore, according to the present invention, the signal output apparatus includes an OSD generating unit for generating the OSD for setting the operation conditions or for controlling the appliance. A first controlling unit decides whether the OSD is transmitted through the analog connection or through the digital connection by checking the volume of the OSD. The first controlling unit controls the OSD generating unit in accordance with the decision. The signal input apparatus includes a video display unit for displaying the digital video contents and the OSD transmitted from the signal output apparatus. A second controlling unit controls the video display unit so that the input terminal is changed to the analog terminal when a transmission of the OSD, more than a certain volume in information, transmitted by the signal output apparatus, is detected.

The OSD generating unit includes a digital/analog (D/A) change unit for transmitting the OSD, more than a certain volume, through the analog connection. The video display unit includes a video processing unit for compounding and processing the video signal of the digital AV contents transmitted through the digital connection and the OSD in the D/A change unit when the OSD is displayed.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
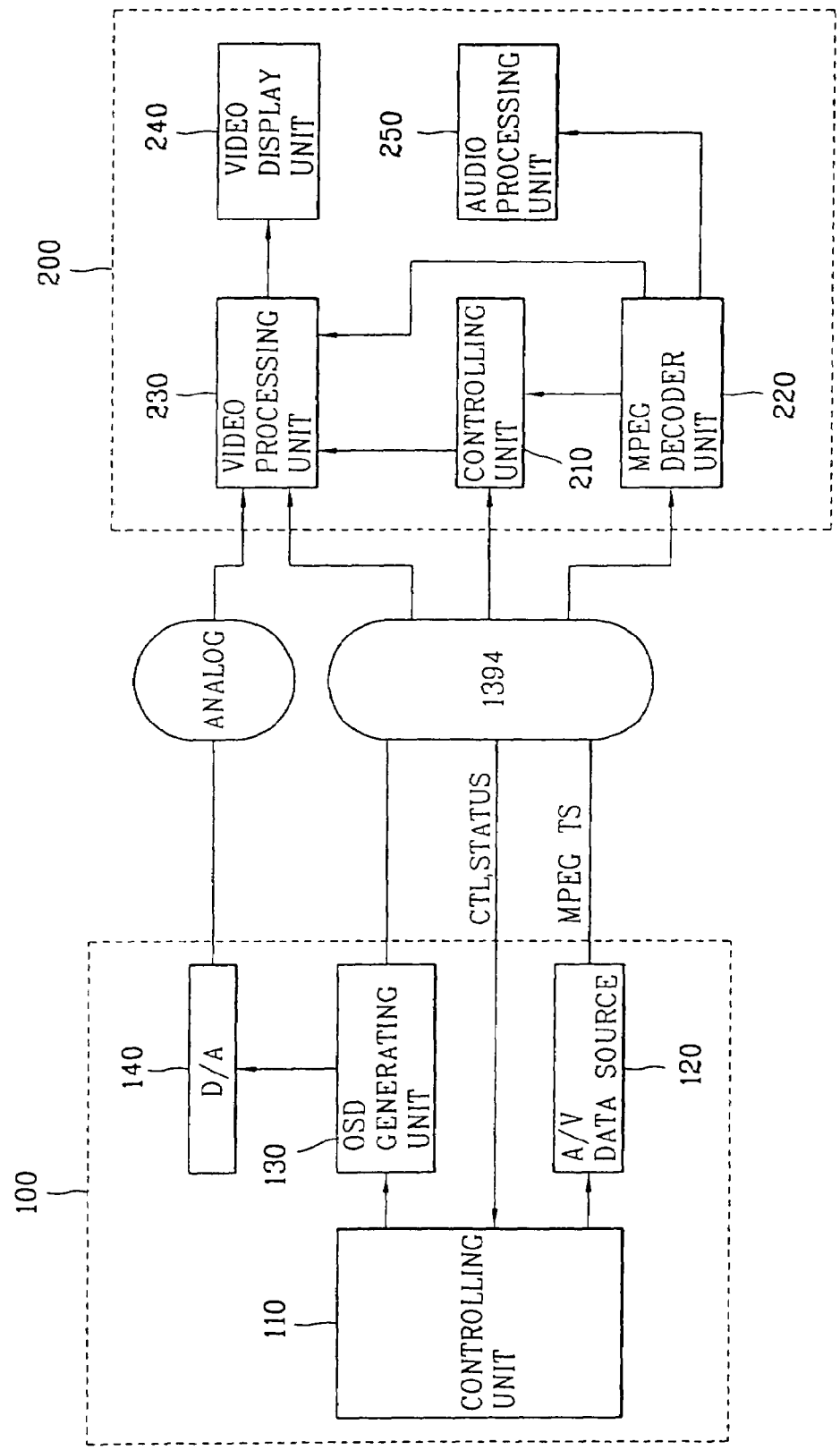
FIG. 1 is a block diagram showing a connection between appliances, according to an embodiment of the present invention.

FIG. 1 is a block diagram showing an apparatus according to one embodiment of the present invention. As shown therein, there are provided a signal output apparatus 100 including an A/V (Audio/Video) data source 120 encoding digital AV contents and transmitting them by MPEG TS (Motion Picture Experts Group-Transport Stream) format, an OSD (On-Screen Display) generating unit 130 generating OSD displaying a status or operation condition of the appliances which will be controlled, a D/A (Digital/Analog) change unit 140 changing the OSD in the OSD generating unit 130 into an analog signal for transmission through an analog path, and a controlling unit 110 deciding whether a transmission path of the OSD is an analog path or a digital path by checking the volume of OSD while controlling the AV data source 120 and transmitting the decision to the OSD generating unit 130 and the appliance displaying the digital AV contents. A signal input apparatus includes an MPEG decoder 220 processing the MPEG TS signal from the signal output apparatus, which includes the digital AV contents, and outputting an audio and video signal, a video processing unit 230 compounding the video signal from the MPEG decoder 220 and the OSD from the signal output apparatus 100, a video display unit 240 displaying the video content of the digital AV contents and the OSD on a screen upon input of the video output signal from the video processing unit 230. A controlling unit 210 displays the digital AV contents by controlling the MPEG decoder 220 while transmitting/receiving the data with the controlling unit 110, included in the signal output apparatus 100. The controlling unit 220 switches the video input terminal of the video display unit according to the decision of the path in the controlling unit 110 in OSD display mode. The signal input apparatus 200 and signal output apparatus 100 are connected through digital and analog connections.

Figure 2:
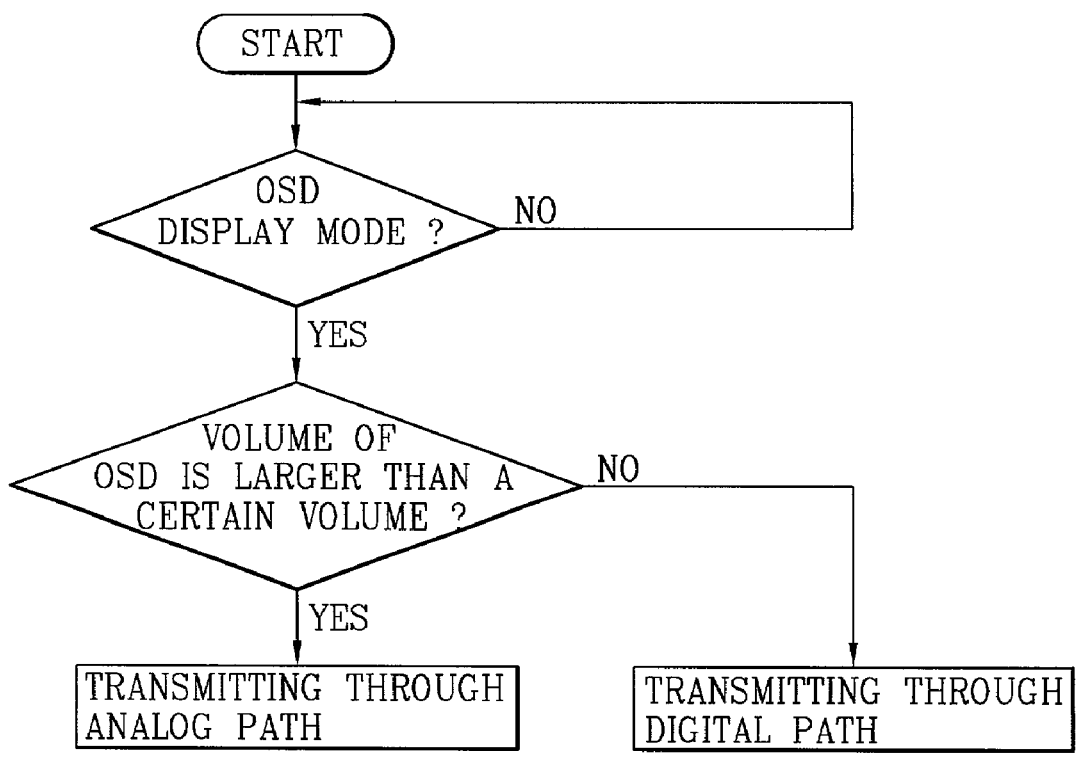
FIG. 2 is a flow chart of operation for an on-screen display, according to the embodiment of the present invention.

The operation and effect of the embodiment according to the present invention will be described with reference to FIG. 2.

Figure 3:
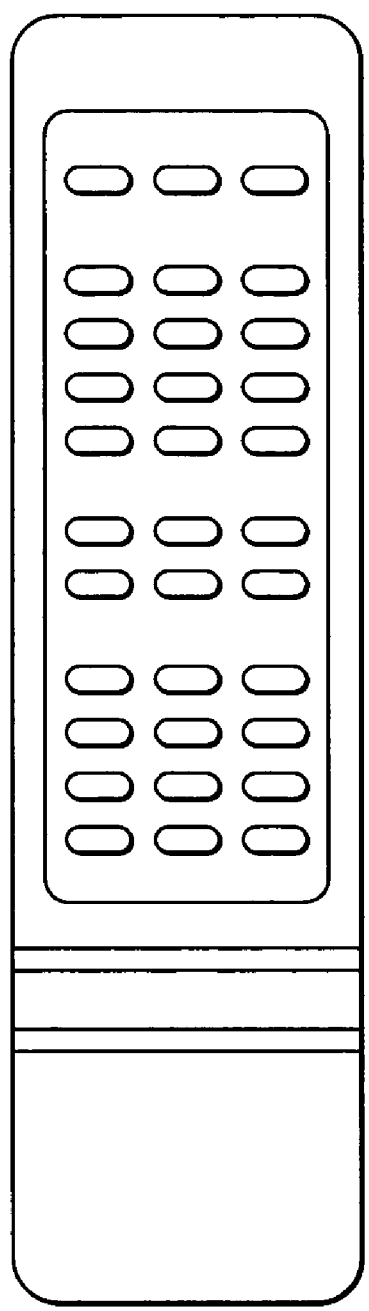
FIG. 3 is an example of a remote controller with which the present invention can be implemented.

A user chooses an appliance transmitting the wanted AV contents (the signal output apparatus 100 in FIG. 1) using a remote controller (e.g., as shown in FIG. 3) or key matrix of an appliance receiving the digital AV contents (the signal input apparatus 200 in FIG. 1). A digital connection is established between the signal output apparatus 100 and the signal input apparatus 200.

When the digital connection is established, the signal output apparatus 100 transmitting the digital AV contents, controls the AV data source 120 so that the controlling unit 110 transmits the digital AV contents to the signal input apparatus 200 through the digital connection. The signal input apparatus 200, receiving the digital AV contents, controls the MPEG decoder unit 220 so that the controlling unit 210 displays the AV contents on the screen of the video display unit 240.

At that time, the MPEG decoder unit 220 outputs the video signal to the video processing unit 230, and at the same time, outputs the audio signal to the audio processing unit 250 by performing signal processing on the digital AV contents of the MPEG TS input format received from the signal output apparatus 100.

Accordingly, the video display unit 240, being inputted the video signal through the video processing unit 230, displays the video component of the digital AV contents on a screen, and at the same time, the audio processing unit 250, being inputted the audio signal, outputs an voice signal corresponding to the audio component of the digital AV contents.

If the user pushes a certain key on the remote controller of the signal output apparatus 100 in order to display user inputs, this results in identifying information about the signal output apparatus 100 being displayed in an OSD form. The controlling unit 110 decides whether the volume of the OSD is larger than a certain volume, which may be preset.

At that time, if the volume of the OSD, which is about to be displayed, is smaller than a certain volume, the controlling unit 110 controls the OSD generating unit 130, so that the OSD is generated and transmitted to the signal input apparatus 200 through the digital connection. Further, the controlling unit 110 transmits the status that the OSD is being transmitted through the digital connection to the controlling unit 210 of the signal input apparatus 200.

Accordingly, the signal input apparatus 200 controls the video processing unit 230 so that the video controlling unit 230 receives the OSD from the OSD generating unit 130, through the digital connection, and displays it on the screen of the video displaying unit 240. By this turn of events, the user is able to identify operation conditions or to perform setting operations using the OSD.

If the volume of the OSD is judged to be larger than a certain volume, the controlling unit 110 controls the OSD generating unit 130 so that the OSD is outputted through the analog connection, not through the digital connection. Further, the controlling unit 110 informs the controlling unit 210 of the signal input apparatus 200 of that fact.

At that time, when the OSD generating unit 130 generates the OSD corresponding to the user input, the D/A change unit 140 changes the OSD into an analog OSD signal and transmits the signal to the signal input apparatus 200 through the analog terminal.

Accordingly, in the signal input apparatus 200, the video processing unit 240 receives the video signal from the MPEG decoder, and at the same time, receives the OSD signal through the analog terminal by the control of the controlling unit 210. The OSD signal is outputted to the video display unit 240 after a certain signal process is performed, whereby the digital AV contents and the OSD are displayed on the screen and the user is able to perform identifying or setting operations for the corresponding input.

After that, if the user ends the OSD display, or if the OSD display is assumed to be no longer needed because of a passing of a certain time during the display of the OSD, the controlling unit 110 controls the OSD generating unit 130 so that the generation of OSD is ended. The ending of the OSD is informed to the controlling unit 210 of the signal input apparatus 200.

Accordingly, the video processing unit 230 switches from the analog terminal for receiving the OSD to the digital terminal by control of the controlling unit 210 of the signal input apparatus 200.

That is, in the conventional art, the OSD is transmitted through the digital connection, and therefore lowering of transmission speed happens. However, according to the present invention, the OSD is transmitted through the analog connection, when the volume of the OSD is larger than a certain volume, whereby the user is able to see the digital AV contents and the OSD in real-time.

For identifying the operation conditions and setting the controlling parameters of an appliance, the remote controller of the appliance is used. The digital connection between the signal input apparatus 200 and the signal output apparatus 100 is able to be made, so that the OSD screen for setting the operations and controlling parameters of the signal output apparatus 100 is able to be displayed using the remote controller of the signal input apparatus 200. By this arrangement, the user is able to input commands for the signal output apparatus 100 even if the signal output apparatus 100 is located in a place where the signal input apparatus 200 is not located.

On the contrary, on the side of the signal output apparatus 100, identifying of the operations and setting the control parameters for the signal input apparatus 200 are able to be made.

As described above, according to the present invention, a graphic OSD of large amount, such as required for identifying the status of an appliance or changing control settings, is transmitted through an analog interface, whereby the OSD of this large amount is able to be provided in real-time, while the digital AV contents are provided in the digital form.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalence of such meets and bounds are therefore intended to be embraced by the appended claims.

What is claimed is:

1. A method for transmitting digital AV(Audio/Video) contents and an on-screen display (OSD), said method comprising:
    determining whether contents are requested;
    determining whether the requested contents are an OSD;
    if so, checking a volume of the OSD; and
    determining whether the volume of the OSD is larger than a certain volume, and if so transmitting the OSD in analog form through an analog connection, and if the volume of the OSD is not larger than the certain volume, transmitting the OSD in digital form through a digital connection.

2. The method according to claim 1, wherein the digital AV contents are transmitted through the digital connection while the OSD is transmitted through the analog connection or digital connection.

3. The method according to claim 1, further comprising: transmitting an indication signal to indicate whether the OSD is being transmitted through the analog connection.

4. The method according to claim 3, further comprising:
    receiving the digital AV contents, the OSD and the indication signal at a signal input apparatus; and
    processing the indication signal at the signal input apparatus to switch between a first input terminal for selecting the OSD in the analog form and a second input terminal for selecting the OSD in the digital form.

5. The method according to claim 1, wherein said step of determining whether the information is an OSD includes sensing a user's input requesting a setting status or command to change a control parameter.

6. The method according to claim 5, wherein the user's input is received via a remote control.

7. The method according to claim 1, further comprising: displaying the digital AV contents and the transmitted OSD in real time.

8. The method according to claim 1, wherein the OSD identifies a status of an appliance or is used to change a setting of the appliance.

9. The method according to claim 1, wherein in the transmitting step, the digital connection includes an IEEE 1394 interface.

10. A system comprising:
    a signal output apparatus including:
        an audio/video(AV) data source for transmitting digital AV contents;
        an on screen display(OSD) generating unit for generating an OSD;
        a first controlling unit for controlling operation conditions of said AV data source and said OSD generating unit;
        a digital transmission terminal connected to said AV data source; and
        an analog transmission terminal,
    wherein said first controlling unit determines that contents are requested, said first controlling unit determines that requested contents are an OSD, and if so, said first controlling unit checks a size of the OSD, compares a size of the OSD to a preset size, and based upon the comparison, transmits the OSD over one of the digital transmission terminal or the analog transmission terminal.

11. The system according to claim 10, wherein if the size of the OSD exceeds the preset size, the OSD is transmitted in analog form over the analog transmission terminal.

12. The system according to claim 11, wherein the digital AV contents are transmitted over the digital transmission terminal at the same time that the OSD is transmitted over the analog transmission terminal.

13. The system according to claim 10, wherein if the size of the OSD does not exceed the preset size, the OSD is transmitted in digital form over the digital transmission terminal.

14. The system according to claim 13, wherein the digital AV contents are transmitted over the digital transmission terminal at the same time that the OSD is transmitted over the digital transmission terminal.

15. The system according to claim 10, further comprising:
    a remote control, wherein said first controlling unit judges that an OSD is needed by sensing a user's input on said remote control.

16. The system according to claim 10, wherein said first controlling unit transmits an indication signal to indicate whether the OSD is being transmitted through the analog transmission terminal or the digital transmission terminal.

17. The system according to claim 16, wherein the indication signal is transmitted over the digital transmission terminal.

18. The system according to claim 10, further comprising:
    a signal input apparatus, physically separate from said signal output apparatus, said signal input apparatus including:
        an MPEG decoder unit for connection to said digital transmission terminal;
        the switching unit to select the OSD in either analog form or digital form; and
        a second controlling unit for controlling the switching unit.

19. An apparatus for transmitting digital AV(Audio/Video) contents and an on-screen display (OSD), the apparatus comprising:
    an analog connection;
    a digital connection; and
    a controller determining whether contents are requested; determining whether the requested contents are an OSD; if so, checking a volume of the OSD; and determining whether the volume of the OSD is larger than a certain volume, and if so transmitting the OSD in analog form through an analog connection, and if the volume of the OSD is not larger than the certain volume, transmitting the OSD in digital form through a digital connection.

20. The apparatus according to claim 19, further comprising:
an AV content source transmitting digital AV contents while the OSD is being transmitted through the analog or digital connection in real time.

21. A method for transmitting an on-screen display (OSD), the method comprising:
determining an OSD for transmission;
comparing a volume of an OSD to be transmitted with a certain volume; and
selecting either an analog transmission or a digital transmission of the OSD based on the comparison result.

22. The method according to claim 21, wherein if the comparison result indicates that the volume of the OSD is smaller than the certain volume, the selecting step selects the digital transmission of the OSD.

23. The method according to claim 21, wherein if the comparison result indicates that the volume of the OSD is larger than the certain volume, the selecting step selects the analog transmission of the OSD.

* * * * *